United States Patent
Xu et al.

(10) Patent No.: US 9,929,842 B2
(45) Date of Patent: Mar. 27, 2018

(54) METHOD AND DEVICE FOR TRANSMITTING REFERENCE SIGNAL, METHOD AND DEVICE FOR RECEIVING THE SAME

(71) Applicant: BEIJING SPREADTRUM HI-TECH COMMUNICATIONS TECHNOLOGY CO., LTD., Beijing (CN)

(72) Inventors: Weijie Xu, Shanghai (CN); Zhengang Pan, Shanghai (CN)

(73) Assignee: BEIJING SPREADTRUM HI-TECH COMMUNICATIONS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/401,410

(22) Filed: Jan. 9, 2017

(65) Prior Publication Data

US 2017/0201361 A1    Jul. 13, 2017

(30) Foreign Application Priority Data

Jan. 11, 2016 (CN) .......................... 2016 1 0016304

(51) Int. Cl.
*H04L 5/00* (2006.01)
*H04W 52/32* (2009.01)

(52) U.S. Cl.
CPC ......... *H04L 5/0048* (2013.01); *H04W 52/325* (2013.01)

(58) Field of Classification Search
CPC .......................... H04L 5/0048; H04W 52/325
See application file for complete search history.

(56) References Cited

U.S. PATENT DOCUMENTS

| | | | |
|---|---|---|---|
| 2015/0215908 A1* | 7/2015 | Seo ........................ | H04L 5/0048 370/329 |
| 2016/0119901 A1* | 4/2016 | Zhang ................... | H04L 5/0048 370/329 |
| 2017/0187499 A1* | 6/2017 | Hwang ................... | H04L 5/005 |
| 2017/0201306 A1* | 7/2017 | Shimezawa ........... | H04B 7/0626 |

\* cited by examiner

*Primary Examiner* — Duc C Ho
(74) *Attorney, Agent, or Firm* — Cantor Colburn LLP

(57) ABSTRACT

The present disclosure provides a method and device for transmitting a reference signal, a method and device for receiving the same, the transmitting method includes: determining a first antenna port for transmitting a demodulation reference signal and a second antenna port for transmitting an enhanced reference signal, where the second antenna port and the first antenna port have an association; setting a transmitting power for the demodulation reference signal and a transmitting power for the enhanced reference signal; transmitting the demodulation reference signal and the enhanced reference signal to a terminal based on the first antenna port being determined for transmitting the demodulation reference signal and the second antenna port being determined for transmitting the enhanced reference signal, and according to the transmitting powers being set. Accordingly, when present technical solution is applied, a channel estimation performance and a RRM measurement performance of a NB-IOT terminal can be effectively improved.

38 Claims, 7 Drawing Sheets

METHOD AND DEVICE FOR TRANSMITTING REFERENCE SIGNAL, METHOD AND DEVICE FOR RECEIVING THE SAME

CROSS-REFERENCE TO RELATED APPLICATIONS

This application claims the benefit of priority to Chinese Patent Application No. 201610016304.6, filed on 11 Jan. 2016, and entitled "METHOD AND DEVICE FOR TRANSMITTING REFERENCE SIGNAL, METHOD AND DEVICE FOR RECEIVING THE SAME", and the entire disclosure of which is incorporated herein by reference.

TECHNICAL FIELD

The present disclosure generally relates to technical field of Narrow-Band Internet of Things, and more particularly, to a method for transmitting a reference signal, a device for transmitting a reference signal, a method for receiving a reference signal, and a device for receiving a reference signal.

BACKGROUND

Internet of Things is still in the ascendant, and M2M (Machine to Machine) communication attracts more and more attentions in the communication industry. It is predictable that, various industries, such as intelligent water and electricity meter, intelligent logistic tracking, wearable device, vehicles internet, intelligent industrial control, will apply the Internet of Things technique to accomplish corresponding industrial upgrades. Given this, in the future, amount of Internet of Things terminals will far surpass that of H2H (Human to Human) communication terminals, which may reach ten billions or even hundreds of billions. In addition, a quite amount of Internet of Things applications possesses properties, such as small in data volume, insensitive to transmission delay, a relatively long transmission cycle. These properties provide a possibility of developing low-cost Internet of Things terminals. Further, low-cost of the terminals will facilitate popularization of the Internet of Things.

In practical applications of the Internet of Things in some regions, it has been found that, in some application scenarios of the Internet of Things, such as the intelligent water and electricity meter, the intelligent wireless sensor in a basement, terminal signals are affected by an installation position or blocking of buildings, and attenuate greatly. Accordingly, coverage-enhancing technology is applied to improve network coverage without increasing investment of operators, so as to meet requirements of network coverage in the above recited scenarios. Currently, a target demand value of a typical coverage enhancement provided by the operators is 15-20 dB.

In order to meet above recited requirements, 3GPP ($3^{rd}$ Generation Partnership Project) provides a solution for low-cost Internet of Things terminals and coverage enhancements. The low-cost Internet of Things terminals are realized mainly by ways, for example, reducing terminal working band width, decreasing number of terminal radio frequency receiving link channels, reducing terminal peak rate, reducing terminal processing complexity, etc. Further, the coverage enhancement can be realized by ways, such as signal or channel repeating, frequency hopping, transmittal power improvement. In the 3GPP RELEASE 13, NB-IOT (Narrow Band Internet of Things) project sets a goal of designing a NB-IOT terminal only supporting a RF (Radio Frequency) band width of 180 KHz, wherein the NB-IOT terminal is not only able to work on an independent carrier wave (e.g., a carrier wave reusing existing GSM 200 KHz band width), but also able to work inside a band width of a LTE (Long Term Evolution) system.

Band width of the NB-IOT terminal is narrow, and the band width of 180 KHz only corresponds to one PRB (Physical Resource Block) of an existing LTE system, thus, if a reference signal (e.g., C-RS or UE-RS) of the existing LTE system is applied, under the scenario of coverage enhancing, a channel estimation performance may be seriously insufficient, which may cause low efficiency of the system. Moreover, when implementing a RRM (Radio Resource Management) measurement (e.g., RSRP measurement) based on existing reference signals in one PRB, an accuracy of the RRM measurement may be seriously insufficient, thus under the scenario of coverage enhancing, it will be almost impossible to obtain a measurement result meeting measurement accuracy requirements in some working range, such as a working range about −20 dB.

SUMMARY

Problem solved by the present disclosure includes that: under a scenario of coverage enhancing, a channel estimation performance and a RRM measurement performance of a NB-IOT terminal can not meet corresponding requirements, which will cause severe degrading of a demodulation performance, thus a working efficiency of the system will be low.

In order to solve the above recited problem, an embodiment of the present disclosure provides a method for transmitting a reference signal, including: determining at least one first antenna port for transmitting a demodulation reference signal and at least one second antenna port for transmitting an enhanced reference signal, respectively, where the at least one second antenna port and the at least one first antenna port have an association; setting a transmitting power for the demodulation reference signal and a transmitting power for the enhanced reference signal, respectively; and transmitting the demodulation reference signal and the enhanced reference signal to a terminal based on the at least one first antenna port being determined for transmitting the demodulation reference signal and the at least one second antenna port being determined for transmitting the enhanced reference signal, and according to the transmitting powers being set.

In some embodiments, determining at least one first antenna port for transmitting a demodulation reference signal and at least one second antenna port for transmitting an enhanced reference signal, respectively, includes: if a number of the at least one first antenna port being determined for transmitting the demodulation reference signal is one, determining the first antenna port to serve as the at least one second antenna port for transmitting the enhanced reference signal.

In some embodiments, determining at least one first antenna port for transmitting a demodulation reference signal and at least one second antenna port for transmitting an enhanced reference signal, respectively, includes: if a number of the at least one first antenna port being determined for transmitting the demodulation reference signal and a number of the at least one second antenna port being determined for transmitting the enhanced reference signal are equal and greater than one, determining the first antenna ports for transmitting the demodulation reference signal and the second antenna ports for transmitting the enhanced reference signal to correspond with each other in a one-to-one manner.

In some embodiments, determining at least one first antenna port for transmitting a demodulation reference signal and at least one second antenna port for transmitting an enhanced reference signal, respectively, includes: if a number of the at least one first antenna port being determined for transmitting the demodulation reference signal is greater than one, and the enhanced reference signal includes multiple segmental reference signals, determining the first antenna ports to serve as the at least one second antenna ports for transmitting the multiple segmental reference signals in the enhanced reference signal, respectively.

In some embodiments, determining at least one first antenna port for transmitting a demodulation reference signal and at least one second antenna port for transmitting an enhanced reference signal, respectively, includes: if a number of the at least one first antenna port being determined for transmitting the demodulation reference signal is greater than one, and the enhanced reference signal is determined to be sent according to a pre-determined transmission cycle, determining the first antenna ports to serve as the at least one second antenna port for transmitting the enhanced reference signal in each transmission cycle in turn.

In some embodiments, the method for transmitting a reference signal further includes: determining a first EPRE of the demodulation reference signal and a second EPRE of the enhanced reference signal, respectively, and determining a ratio of the first EPRE to the second EPRE; and sending the ratio to the terminal through a signaling.

In some embodiments, setting a transmitting power for the demodulation reference signal and a transmitting power for the enhanced reference signal, respectively, includes: respectively setting the transmitting power for the demodulation reference signal and the transmitting power for the enhanced reference signal according to a pre-determined ratio of a first EPRE of the demodulation reference signal to a second EPRE of the enhanced reference signal.

In some embodiments, the ratio of the first EPRE to the second EPRE is one.

In some embodiments, the signaling is a MIB signaling or a SIB signaling.

In some embodiments, transmitting the enhanced reference signal to the terminal based on the at least one second antenna port being determined for transmitting the demodulation reference signal and according to the transmitting power for the enhanced reference signal being set includes: transmitting all or a part of the enhanced reference signal at sub-frame positions which locate before a main broadcasting channel and are adjacent to each other.

In some embodiments, the enhanced reference signal is a synchronizing signal.

In some embodiments, the synchronizing signal comprises a primary synchronizing signal and a secondary synchronizing signal.

In some embodiments, the demodulation reference is a C-RS, a UE-RS or a reference signal for the terminal to demodulate physical downlink channel data.

In some embodiments, the terminal is a NB-IOT terminal.

In some embodiments, the enhanced reference signal is transmitted to the terminal according to a pre-determined transmission cycle via the second antenna port.

An embodiment of the present disclosure provides a device for transmitting a reference signal, including: an antenna port determining circuitry configured to determine at least one first antenna port for transmitting a demodulation reference signal and at least one second antenna port for transmitting an enhanced reference signal, respectively, wherein the at least one second antenna port and the at least one first antenna port have an association; a transmitting power determining circuitry configured to set a transmitting power for the demodulation reference signal and a transmitting power for the enhanced reference signal, respectively; and a signal transmitting circuitry configured to transmit the demodulation reference signal and the enhanced reference signal to a terminal based on the at least one first antenna port being determined for transmitting the demodulation reference signal and the at least one second antenna port being determined for transmitting the enhanced reference signal, and according to the transmitting powers being set.

In some embodiments, the antenna port determining circuitry comprises a first determining sub-circuitry configured to: if a number of the at least one first antenna port being determined for transmitting the demodulation reference signal is one, determine the first antenna port to serve as the at least one second antenna port for transmitting the enhanced reference signal.

In some embodiments, the antenna port determining circuitry comprises a second determining sub-circuitry configured to: if a number of the at least one first antenna port being determined for transmitting the demodulation reference signal and a number of the at least one second antenna port being determined for transmitting the enhanced reference signal are equal and greater than one, determine the first antenna ports for transmitting the demodulation reference signal and the second antenna ports for transmitting the enhanced reference signal to correspond with each other in a one-to-one manner.

In some embodiments, the antenna port determining circuitry comprises a third determining sub-circuitry configured to: if a number of the at least one first antenna port being determined for transmitting the demodulation reference signal is greater than one, and the enhanced reference signal includes multiple segmental reference signals, determine the first antenna ports to serve as the at least one second antenna ports for transmitting the multiple segmental reference signals in the enhanced reference signal, respectively.

In some embodiments, the antenna port determining circuitry comprises a fourth determining sub-circuitry configured to: if a number of the at least one first antenna port being determined for transmitting the demodulation reference signal is greater than one, and the enhanced reference signal is determined to be sent according to a pre-determined transmission cycle, determine the first antenna ports to serve as the at least one second antenna port for transmitting the enhanced reference signal in the transmission cycle in turn.

In some embodiments, the device for transmitting a reference signal further includes: a ratio determining circuitry configured to: determine a first EPRE of the demodulation reference signal and a second EPRE of the enhanced reference signal, respectively, and determine a ratio of the first EPRE to the second EPRE; and a ratio sending circuitry configured to send the ratio to the terminal through a signaling.

In some embodiments, the transmitting power determining circuitry is further configured to: set the transmitting power for the demodulation reference signal and the transmitting power for the enhanced reference signal according to a pre-determined ratio of a first EPRE of the demodulation reference signal to a second EPRE of the enhanced reference signal, respectively.

In some embodiments, the ratio determining circuitry determines the ratio of the first EPRE to the second EPRE to be one.

In some embodiments, the signaling is a MIB signaling or a SIB signaling.

In some embodiments, the signal transmitting circuitry is configured to transmit all or a part of the enhanced reference signal at sub-frame positions which locate before a main broadcasting channel and are adjacent to each other.

In some embodiments, the enhanced reference signal is a synchronizing signal.

In some embodiments, the synchronizing signal comprises a primary synchronizing signal and a secondary synchronizing signal.

In some embodiments, the demodulation reference is a C-RS, a UE-RS or a reference signal for the terminal to demodulate physical downlink channel data.

In some embodiments, the terminal is a NB-IOT terminal.

In some embodiments, the signal transmitting circuitry is configured to transmit the enhanced reference signal to the terminal according to a pre-determined transmission cycle via the second antenna port.

An embodiment of the present disclosure provides a method for receiving a reference signal, including: receiving a demodulation reference signal and an enhanced reference signal from a base station, respectively, where the demodulation reference signal and the enhanced reference signal are sent from the base station to a terminal by any one of the methods for transmitting a reference signal as recited above; and implementing a united channel estimation using the enhanced reference signal and the demodulation reference signal to obtain a channel estimation result.

In some embodiments, the united channel estimation using the enhanced reference signal and the demodulation reference signal is implemented by a way of moving average.

In some embodiments, the moving average comprises:

in a sub-frame not including the enhanced reference signal, the channel estimation result is:

$$H_n = a*H_{n-1} + (1-a)*h_n;$$

in a sub-frame including the enhanced reference signal, if there is the demodulation reference signal, the channel estimation result is:

$$H_n = p*[a*H_{n-1} + (1-a)*h_n] + (1-p)*h_{enh};\text{ and}$$

in a sub-frame including the enhanced reference signal, if there is no demodulation reference signal, the channel estimation result is:

$$H_n = p*H_{n-1} + (1-p)*h_{enh},$$

wherein $h_n$ is a channel estimation result the terminal obtained by applying the demodulation reference signal; $h_{enh}$ a channel estimation result the terminal obtained by applying the enhanced reference signal; a and p are factors of the moving average, 0<a and p<1; and $H_{n-1}$ is a channel estimation result of a previous sub-frame.

An embodiment of the present disclosure provides a device for receiving a reference signal, including: a reference signal receiving circuitry configured to receive a demodulation reference signal and an enhanced reference signal from a base station, respectively, where the demodulation reference signal and the enhanced reference signal are sent from the base station to a terminal by any one of the devices for transmitting a reference signal as recited above; and a channel estimating circuitry configured to implement a united channel estimation using the enhanced reference signal and the demodulation reference signal to obtain a channel estimation result.

In some embodiments, the channel estimating circuit implements the united channel estimation using the enhanced reference signal and the demodulation reference signal by a way of moving average.

In some embodiments, the channel estimating circuit comprises:

a first channel estimating sub-circuit configured to: in a sub-frame not including the enhanced reference signal, obtain a channel estimation result which is:

$$H_n = a*H_{n-1} + (1-a)*h_n;$$

a second channel estimating sub-circuit configured to: in a sub-frame including the enhanced reference signal, if there is the demodulation reference signal, obtain a channel estimation result which is:

$$H_n = p*[a*H_{n-1} + (1-a)*h_n] + (1-p)*h_{enh};\text{ and}$$

a third channel estimating sub-circuit configured to: in a sub-frame including the enhanced reference signal, if there is no demodulation reference signal, to obtain a channel estimation result which is:

$$H_n = p*H_{n-1} + (1-p)*h_{enh},$$

wherein $h_n$ is a channel estimation result the terminal obtained by applying the demodulation reference signal; $h_{enh}$ a channel estimation result the terminal obtained by applying the enhanced reference signal; a and p are factors of the moving average, 0<a and p<1; and $H_{n-1}$ is a channel estimation result of a previous sub-frame.

In comparison with existing technologies, technical solutions provided by the present disclosure possess following advantages:

The base station introduces an enhanced reference signal, and further determines an association between a second antenna port for transmitting the enhanced reference signal and a first antenna port for transmitting a demodulation reference signal, where the association is determined according to a number of the first antenna port and different enhanced reference signals in combination. By such a way, the enhanced reference signal can be used to improve a channel estimation performance of the demodulation reference signal being transmitted by a same antenna port with the enhanced reference signal without consuming too much resource. Accordingly, a channel estimation performance and a RRM measurement performance of the NB-IOT terminal can be effectively improved.

DETAILED DESCRIPTION

In order to make above recited objectives, features and advantages of the present disclosure clear and easy to understand, embodiments of the present disclosure will be illustrated in detailed as follow in combination with corresponding drawings.

In a LTE (Long Term Evolution) system, a demodulation reference signal for a RRM (Radio Resource Management) measurement is mainly a C-RS (Cell-specific Reference Signal). The C-RS is mainly used for a downlink channel estimation and a demodulation in a non-beam forming mode. Wherein, a beam forming mode means that, a transmitting terminal implements a weighting to data before sends the data to form a narrow transmitted beam for aiming the power to a target user, so as to improve a signal to noise ratio of the target user. According to a transmission mode, the demodulation reference signal for data demodulation may be the C-RS or a UE-RS (User-specific Reference Signal).

Specifically, according to description of the LTE 36.211 protocol, the C-RS in the LTE system is used for functions, such as, data demodulation, RRM measurement. The C-RS sequence is a Gold sequence (referring to section 7.2 of the LTE 36.211 protocol). The C-RS sequence is defined as:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

wherein, $n_s$ indicates a serial number of a time slot in one radio frame; l indicates a serial number of a OFDM (Orthogonal Frequency Division Multiplexing) symbol in one time slot. An initial value of a pseudorandom sequence c(i) is:

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $$N_{CP} = \begin{cases} 1 & \text{for normal } CP \\ 0 & \text{for extended } CP \end{cases}.$$

Figure 1A:
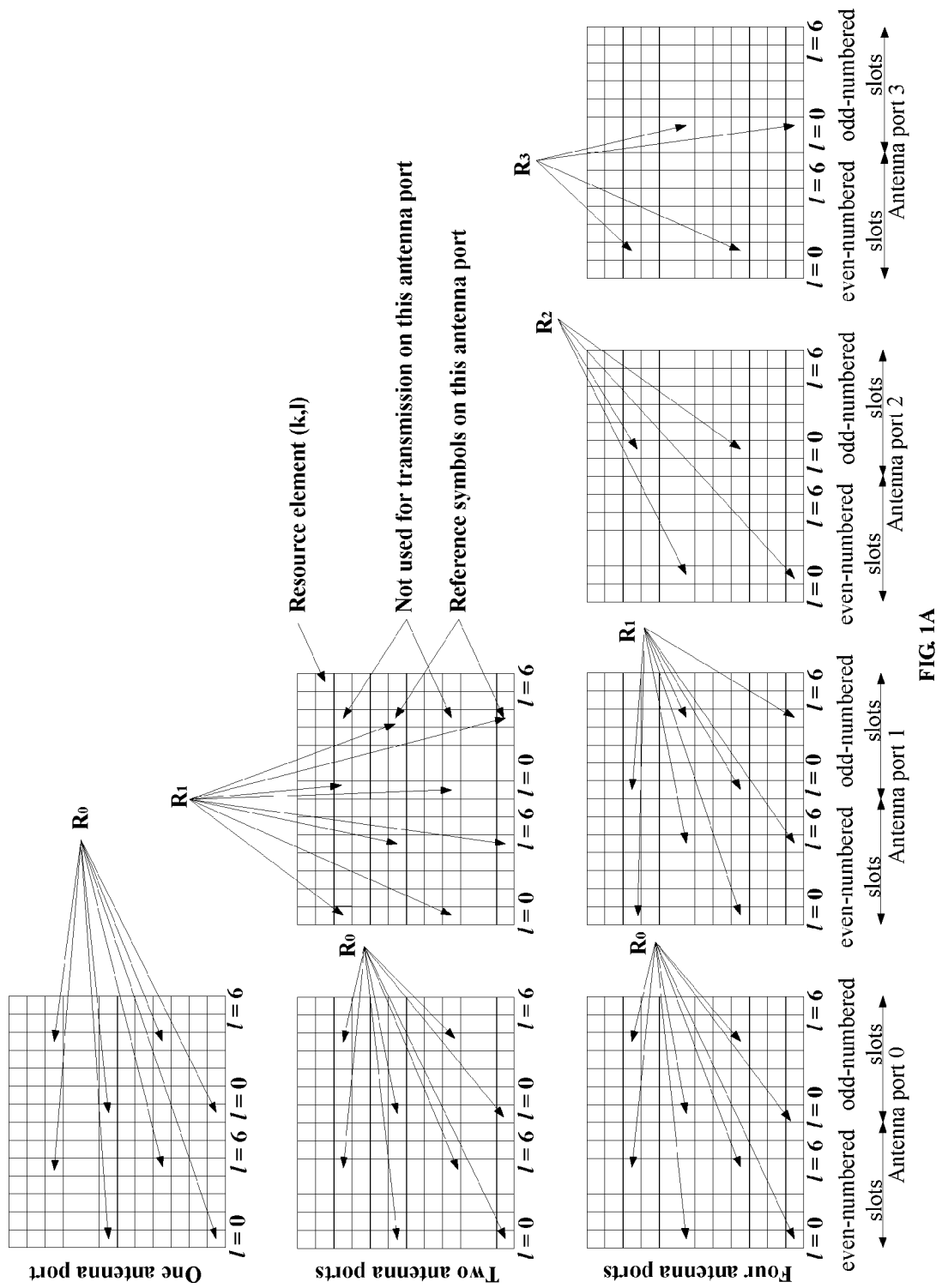
FIG. 1A schematically illustrates a resource mapping of a C-RS signal in a LTE system under a normal CP condition.

A distribution of a pilot frequency pattern of each port of the C-RS is related to factors, such as a cell ID, a CP (Cyclic Prefix) type (e.g., a normal CP or an extended CP). As shown in FIG. 1A, a resource mapping of the C-RS signal under a normal CP condition is illustrated.

According to description of LTE 36.211 protocol, UE-RS is a reference signal used for a terminal demodulating a PDSCH (Physical Downlink Shared Channel) channel. The signal sequence of the UE-RS may also apply the Gold sequence, which is defined as:

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

wherein an initial value of the pseudorandom sequence is: $c_{init} = (\lfloor n_s/2 \rfloor + 1) \cdot (2n_{ID}^{(nSCID)} + 1) \cdot 2^{16} + n_{SCID}$.

Figure 1B:
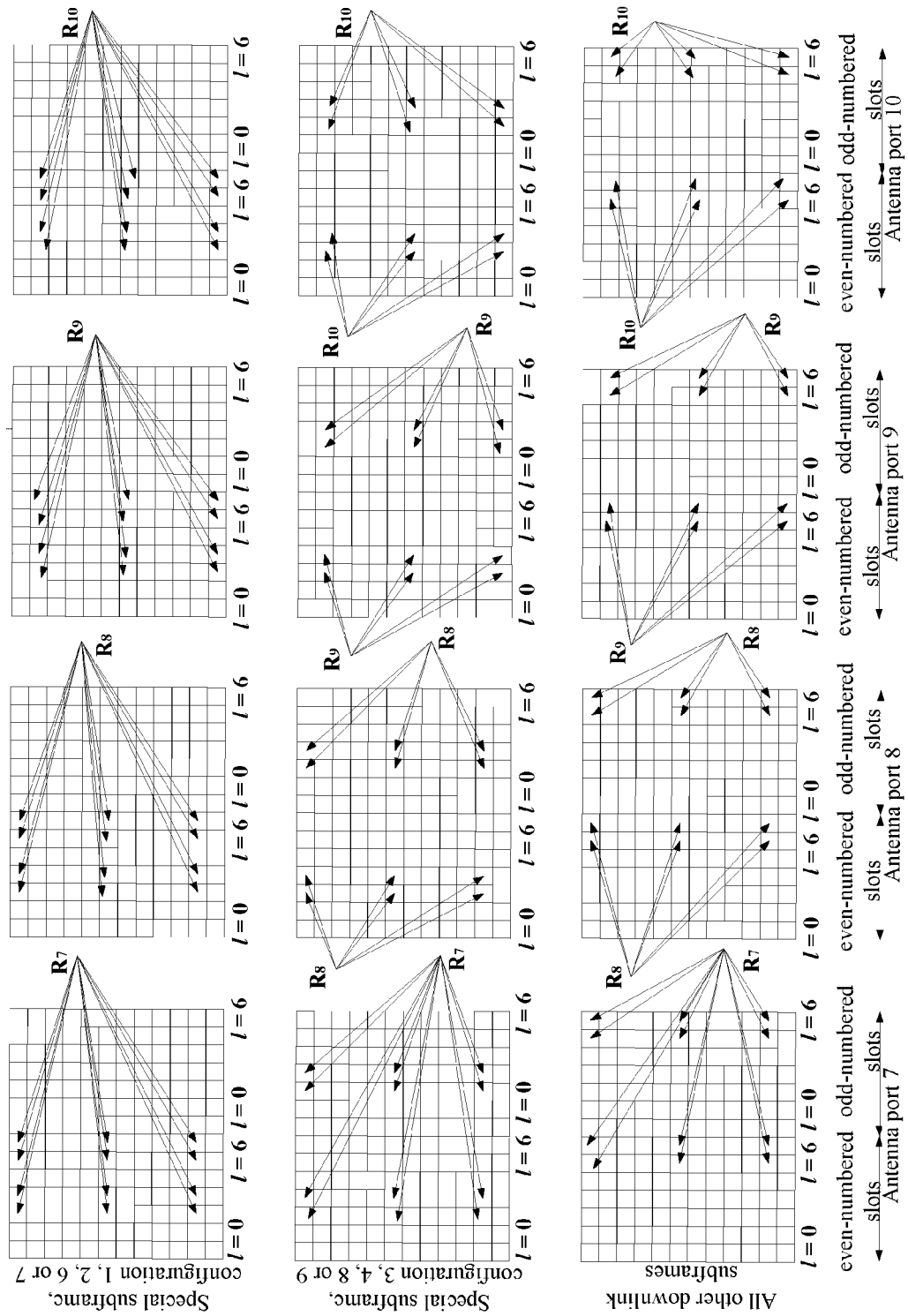
FIG. 1B schematically illustrates a resource mapping of a UE-RS signal in a LTE system under a normal CP condition.

A distribution of a pilot frequency pattern of each port of the UE-RS is related to factors, such as a sub-frame type (e.g., a normal sub-frame or a special sub-frame), a CP (Cyclic Prefix) type (e.g., a normal CP or an extended CP). As shown in FIG. 1B, a resource mapping of the UE-RS signal under a normal CP condition is illustrated.

During research, the inventor has found that, in the NB-IOT (Narrow Band Internet of Things) system, only bandwidth of 180 KHz (i.e., a terminal band width corresponding to one PRB of the LTE system) can be supported, but synchronizing signals PSS (Primary Synchronization Signal) and SSS (Secondary Synchronization Signal) of an existing LTE system need to be mapped to six central PRBs of the band width of the LTE system. As a result, the NB-IOT terminal can not apply existing LTE synchronizing signal to implement cell searching and time-frequency synchronization.

Accordingly, there is a need for a synchronization signal directed to the NB-IOT system, where the synchronization signal includes a NB-PSS (Primary Synchronization Signal) and a NB-SSS (Secondary Synchronization Signal). Wherein, the NB-PSS is applied to the time-frequency synchronization, and the NB-SSS is applied to carry a physical cell ID.

Figure 2A:
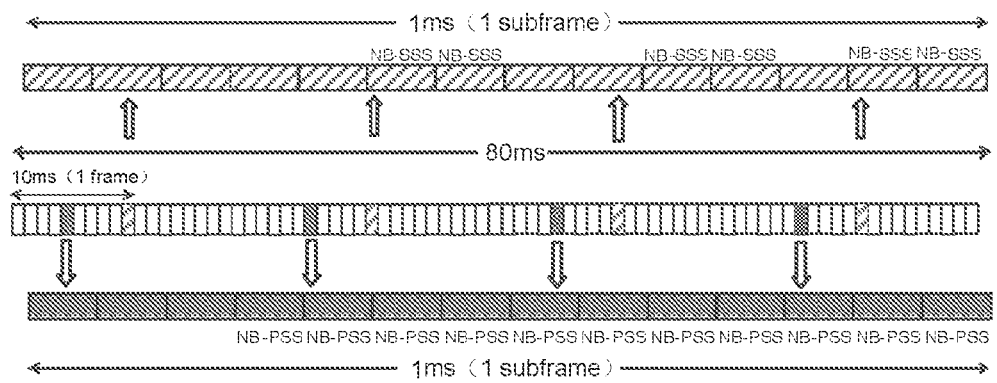
FIG. 2A schematically illustrates a structure of a subframe of a low density synchronizing signal, where the NB-IOT system is under an independently deployed scenario.

According to deployment scenarios, it can be classified into:

1) When the NB-IOT system is independently deployed (e.g., a deployment scenario that multiplexing a GSM carrier wave), a design of a low density synchronizing signal with a large transmission cycle can be applied. For example, a structure of a sub-frame of a low density synchronizing signal as shown in FIG. 2A can be referred. In this case, both the NB-PSS and the NB-SSS apply a transmission cycle of 20 ms, and the NB-PSS and the NB-SSS respectively locate at a sub-frame 4 and a sub-frame 9 of an odd-numbered radio frame.

Figure 2B:
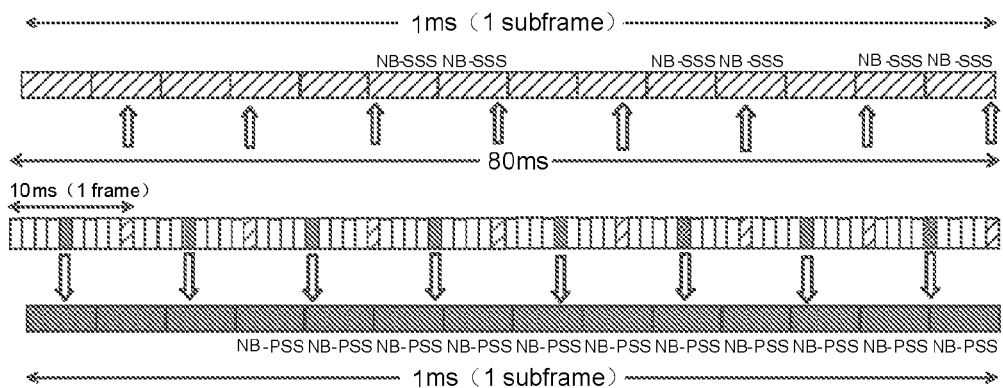
FIG. 2B schematically illustrates a structure of a subframe of a high density synchronizing signal, where the NB-IOT system deploys a scenario in a LTE carrier wave.

2) When the NB-IOT system deploys a scenario in a LTE carrier wave, since the NB-IOT system needs to share the system's transmitting power with the LTE system, a design of a high density synchronizing signal with a small transmission cycle can be applied. For example, a structure of a sub-frame of a high density synchronizing signal as shown in FIG. 2B can be taken as a reference. In this case, the NB-PSS and the NB-SSS respectively locate at sub-frames 4 and sub-frames 9 of each radio frame.

With regard to a specific design of the NB-PSS sequence, since there is a need of supporting the scenario of sharing the system's band width with the LTE, and the first three OFDM symbols in the sub-frame of the LTE is a control domain of the LTE system, thus the NB-PSS signal has eleven OFDM symbols in total from the fourth symbol to the fourteenth symbol of the NB-IOT frame.

The NB-PSS applies a differential Zadoff-Chu sequence. Firstly, generating a Zadoff-Chu sequence having a length of one hundred and thirty $$c(n) = e^{-\frac{j\pi un(n+1)}{N}}, n = \{0, 1, 2, \ldots, 130\}.$$

one as a basic sequence:

Then, implementing a differential encoding to the basic sequence c(n) to obtain a sequence d(n) as following:

$$d(n+1)=d(n)c(n), n=\{0,1,2,\ldots,130\}, d(0)=1.$$

The sequence d(n) is divided into eleven segments, each segment has a length of twelve, and each segment is mapped to twelve sub-carrier-waves in each OFDM symbol. It should be noted that, with regard to a RE (Resource Element) conflicting with the C-RS in the existing LTE system, a corresponding signal of the NB-PSS is not transmitted on the RE carrying the C-RS.

With regard to a specific design of the NB-PSS, in one sub-frame, the NB-PSS may occupy six OFDM symbols which are symbols {5, 6, 9, 10, 12, 13}. The six OFDM symbols do not align with OFDM symbols where the C-RS locates. The NB-SSS is a sequence having a length of seventy two which is constituted by a Zadoff-Chu sequence having a length of sixty one and eleven zeros added at a foremost position. It is easy to support five hundred and four cell IDs by applying different root sequences and corresponding cyclic shift sequences.

In the low density mode and the high density mode, the NB-PSS and the NB-SSS respectively appear four times and eight times within 80 ms, thus the design of the NB-SSS needs to support identification of the four NB-SSS positions or the eight NB-SSS position within 80 ms. Accordingly, besides the Zadoff-Chu sequence, a scramble sequence is needed to further identify the NB-SSS positions within 80 ms.

Specifically, the NB-SSS is indicated as: $s_{p,q}(n)=a_p(n)b_q(n)$, wherein p={0, 1, ..., 503} and q={0, 1, 2, 3, 4, 5, 6, 7}. A sub-frame of the NB-SSS within 80 ms means the qt NB-SSS appeared within 80 ms. Wherein, $$a_p(n) = e^{-\frac{j\pi m_p n(n+1)}{61}},$$
$$n = \{0, 1, \ldots, 60\}$$

$$b_q(n)=b(\mathrm{mod}(n-l_q, 63))n=\{0,1,\ldots 60\}, q=\{0,1,\ldots,7\},$$

$$l_0=0, l_1=17, l_2=3, l_3=23, l_4=7, l_5=29, l_6=11, l_7=37,$$

$$b(n+6)=\mathrm{mod}(b(n)+b(n+1),2), n=\{0,1,\ldots 55\},$$

$$b(0)=1, b(m)=0, m=\{1,2,3,4,5\}.$$

In the above recited equations, $a_p(n)$ is one Zadoff Chu sequence for indicating a set of cell IDs. Root $m_p$ and cyclic shift $k_p$ indicate a specific cell ID, wherein the specific equation is: $m_p=1+\mathrm{mod}(p,61)$ and $$k_p = 7\left\lfloor\frac{p}{61}\right\rfloor.$$

$b_q(n)$ is a scrambling sequence of circularly shifting the basic sequence b(n), for indicating the NB-SSS position within 80 ms. Wherein, $l_q$ is related to q, with regard to the low density scenario, there are four values in total which are respectively $l_0=0, l_1=3, l_2=7, l_3=11$.

It should be noted that, the above recited time-frequency resource distribution and signal sequence design of the NB-PSS and the NB-SSS are just one embodiment of the present disclosure. In practical applications of the NB-IOT system, one skilled in the art may design other synchronizing signals, which will not be described in detail herein.

It can be seen that, inside one PRB, in order to avoid that the LTE system bring in large system resource spending, C-RS port 0 and port 1 respectively have eight REs (Resource Element) only, but each port of the UE-RS has twelve REs. This kind of low density reference signal design can provide sufficient measurement performance and demodulation performance for the coverage supporting a normal LTE system, that is because, even a LTE terminal locating at a cell margin normally works above −6 dB (which is related to specific network design). Moreover, lower reference signal density is favorable for controlling a pilot frequency resource spending of the system.

However, for the NB-IOT terminal, in the coverage enhancing mode, the NB-IOT terminal needs to work at an extremely low SINR (Signal to Interference plus Noise Radio) range, and the NB-IOT terminal can only receive the reference signal of one PRB every time, the reference signals of multiple PRBs can not be implemented with a united channel estimation. Accordingly, if still applying the existing reference signal design, the channel estimation performance and the RRM measurement performance can not meet requirements, or the demodulation performance may be severely degraded and thus may cause low working efficiency of the system.

Figure 3:
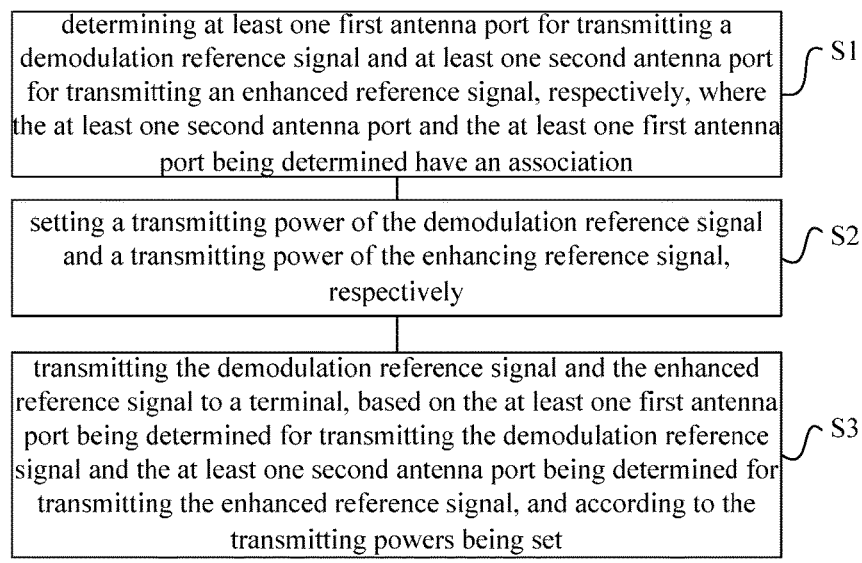
FIG. 3 schematically illustrates a flow chart of a method for transmitting a reference signal according to one embodiment of the present disclosure.

Accordingly, after research, the inventor provides a method for transmitting a reference signal for a NB-IOT terminal. FIG. 3 schematically illustrates a flow chart of a method for transmitting a reference signal according to one embodiment of the present disclosure. Referring to FIG. 3, the transmitting method includes following steps:

Step S1: determining at least one first antenna port for transmitting a demodulation reference signal and at least one second antenna port for transmitting an enhanced reference signal, respectively, where the at least one second antenna port and the at least one first antenna port being determined have an association;

Step S2: setting a transmitting power of the demodulation reference signal and a transmitting power of the enhanced reference signal, respectively; and Step S3: transmitting the demodulation reference signal and the enhanced reference signal to a terminal, based on the at least one first antenna port being determined for transmitting the demodulation reference signal and the at least one second antenna port being determined for transmitting the enhanced reference signal, and according to the transmitting powers being set.

In the step S1, a base station may dispose one or more first antenna ports for transmitting the demodulation reference signal. Different from existing technologies, the base station can implement an enhancement to the channel estimation of the demodulation reference signal and improve the RRM measurement performance by introducing the enhanced reference signal. With configuration of the first antenna port, the base station can further determine the second antenna port for transmitting the enhanced reference signal, where the second antenna port and the first antenna port being determined have an association. Wherein, the association is determined according to a number of the at least one first antenna port and different enhanced reference signals.

Specifically, for example, when the number of the at least one first antenna port being determined for transmitting the demodulation reference signal is one, the first antenna port is determined to serve as the at least one second antenna port for transmitting the enhanced reference signal. For example, for the NB-IOT system, if the enhanced reference signal completely multiplexes above recited design of the synchronizing signal, that is, the synchronizing signal is applied to serve as the enhanced reference signal. Since only the NB-SSS in the synchronizing signal (including NB-PSS and NB-SSS) carries the cell ID, it is preferable that, the first antenna port for transmitting the demodulation reference signal serves as a transmitting port of the NB-SSS.

For another example, when the number of the at least one first antenna port being determined for transmitting the demodulation reference signal and a number of the at least one second antenna port being determined for transmitting the enhanced reference signal are equal and greater than one, then the first antenna ports for transmitting the demodulation reference signal and the second antenna ports for transmitting the enhanced reference signal correspond with each other in an one-to-one manner.

For instance, the number of the at least one first antenna port and the number of the at least one second antenna port are both three, wherein the at least one first antenna port includes a first antenna port PORT0, a first antenna port PORT1 and a first antenna port PORT2. The base station can set that, a second antenna port PORT0' corresponds to the first antenna port PORT0, a second antenna port PORT1' corresponds to the first antenna port PORT1, and a second antenna port PORT2' corresponds to the first antenna port PORT2.

For another example, if the number of the at least one first antenna port being determined for transmitting the demodulation reference signal is greater than one, and the enhanced reference signal includes multiple segmental reference signals, then each of the first antenna ports serves as a second antenna port for transmitting each of the multiple segmental reference signals in the enhanced reference signal, respectively.

Specifically, the base station determines that, the second antenna port applied to transmit a first segment of the enhanced reference signal is the first antenna port PORT0 of the demodulation reference signal, and the second antenna port applied to transmit a second segment of the enhanced reference signal is the second antenna port PORT1'.

With regard to the NB-IOT system, if the enhanced reference signal multiplexes the design in the synchronizing signal, that means, the synchronizing signal NB-PSS and the synchronizing signal NB-SSS serve as the enhanced reference signal, and the enhanced reference signal includes two parts of reference signal (i.e., NB-PSS and NB-SSS), wherein the NB-SSS is a primary synchronizing signal, and the NB-PSS is a secondary synchronizing signal. The base station determines that, the first antenna port PORT0 is applied when transmitting the NB-PSS, and the first antenna port PORT1 is applied when transmitting NB-SSS.

For another example, when the number of the at least one first antenna port being determined for transmitting the demodulation reference signal is greater than one, and the enhanced reference signal is sent according to a pre-determined transmission cycle, then the multiple first antenna ports are determined to serve as the at least one second antenna port for transmitting the enhanced reference signal in the transmission cycle in turn.

Specifically, in the present embodiment, the enhanced reference signal may apply a periodic transmission, a value of the transmission cycle may be determined based on a signal estimation performance and a RRM measurement performance provided by the enhanced reference signal. The smaller the transmission cycle is, the better the performance is, but the larger the resource spending is brought; on the contrary, the larger the transmission cycle is, the worse the performance is, but the smaller the resource spending is. With regard to the NB-IOT system in coverage enhancing scenario, since a movement speed of the terminal is low or the terminal is in a condition of rest, time relating to the signal channel is relatively long, thus the transmission cycle may be set to be 20 ms. For example, with regard to a FDD (Frequency Division Duplexing) system, the enhanced reference signal may locate at sub-frame 5 (the sub-frame in one radio frame is numbered from zero) of each even-numbered radio frame.

For instance, if the at least one first antenna port for transmitting the demodulation reference signal includes two antenna ports (e.g., the first antenna ports PORT0 and PORT1), and the base station needs to send the enhanced reference signal once every 20 ms, then a periodically distributed time window is 40 ms. As such, signal transmission in a first 20 ms of the periodically distributed time window applies the first antenna port PORT0 of the demodulation reference signal, and a second 20 ms of the periodically distributed time window applies the first antenna port PORT1.

Again, taking the NB-IOT system as an example, if the enhanced reference signal completely multiplexes above recited design in the synchronizing signal, that is, the synchronizing signal is applied to serve as the enhanced reference signal, since in the synchronizing signal (including NB-PSS signal and NB-SSS signal), only the NB-SSS signal carries the cell ID, only the NB-SSS can serve as the enhanced reference signal. However, there are two first antenna ports (i.e., the first antenna ports PORT0 and PORT1) for transmitting the demodulation reference signal. In this case, the NB-SSS signals being transmitted at different times in a periodical window may correspond to different antenna ports of the demodulation reference signal.

Figure 4:
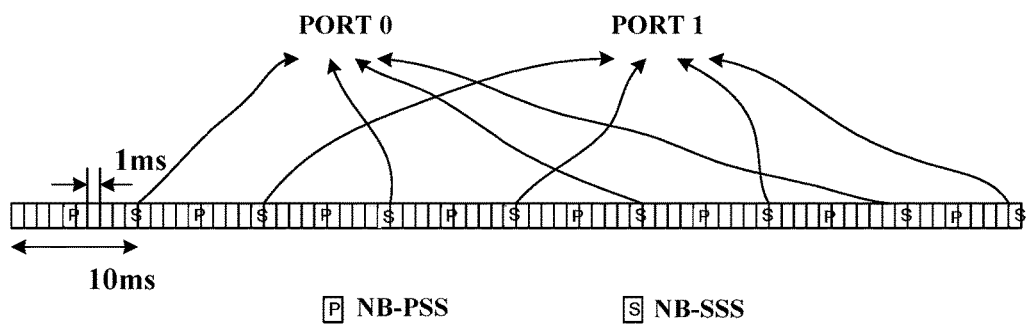
FIG. 4 schematically illustrates a resource mapping of an enhanced reference signal according to one embodiment of the present disclosure.

For example, FIG. 4 schematically illustrates a relation between the NB-SSS and the ports of the demodulation reference signal. When the transmission cycle for transmitting the NB-SSS is 10 ms, the periodical window is 20 ms, wherein the first NB-SSS in the 20 ms is sent by applying the first antenna port POERT0 of the demodulation reference signal, and the second NB-SSS in the 20 ms is sent by applying the first antenna port PORT1 of the demodulation reference signal.

According to the association between the second antenna port for transmitting the enhanced reference signal and the first antenna port for transmitting the demodulation reference signal exemplarily given in the above recited embodiment, it can be seen that, when such a solution is applied, on the premise of not bringing in too much resource consumption, the enhanced reference signal being introduced can be used to improve the channel estimation performance of the demodulation reference signal being sent by applying the same antenna port with the enhanced reference signal.

In the step S3, transmitting the enhanced reference signal to the terminal based on the at least one second antenna port being determined for transmitting the enhanced reference signal and according to the transmitting power being set includes: transmitting all or a part of the enhanced reference signal at sub-frame positions which locate before a main broadcasting channel and are adjacent to each other. As such, it is easy for the terminal to receive the enhanced reference signal at adjacent sub-frames.

With regard to the NB-IOT system, since there is a need of supporting the deploying scenario when the brand width of the NB-IOT locates in the LTE system, the enhanced reference signal can not occupy a control domain of the LTE system and the REs occupied by original demodulation reference signal (e.g., C-RS, C-RS port of 0, 1, 2, 3) of the LTE system. Except that, in one sub-frame, the enhanced reference signal can occupy other REs on the OFDM symbols from the fourth OFDM symbol to the fourteenth OFDM symbol in the band width of the NB-IOT (i.e., in one PRB) except that already been occupied by the C-RS signal. In some other embodiments, according to performance needs, the enhanced reference signal may occupy resources of more than one sub-frame, or, occupy resources on part of the OFDM symbols in one sub-frame.

Figure 5:
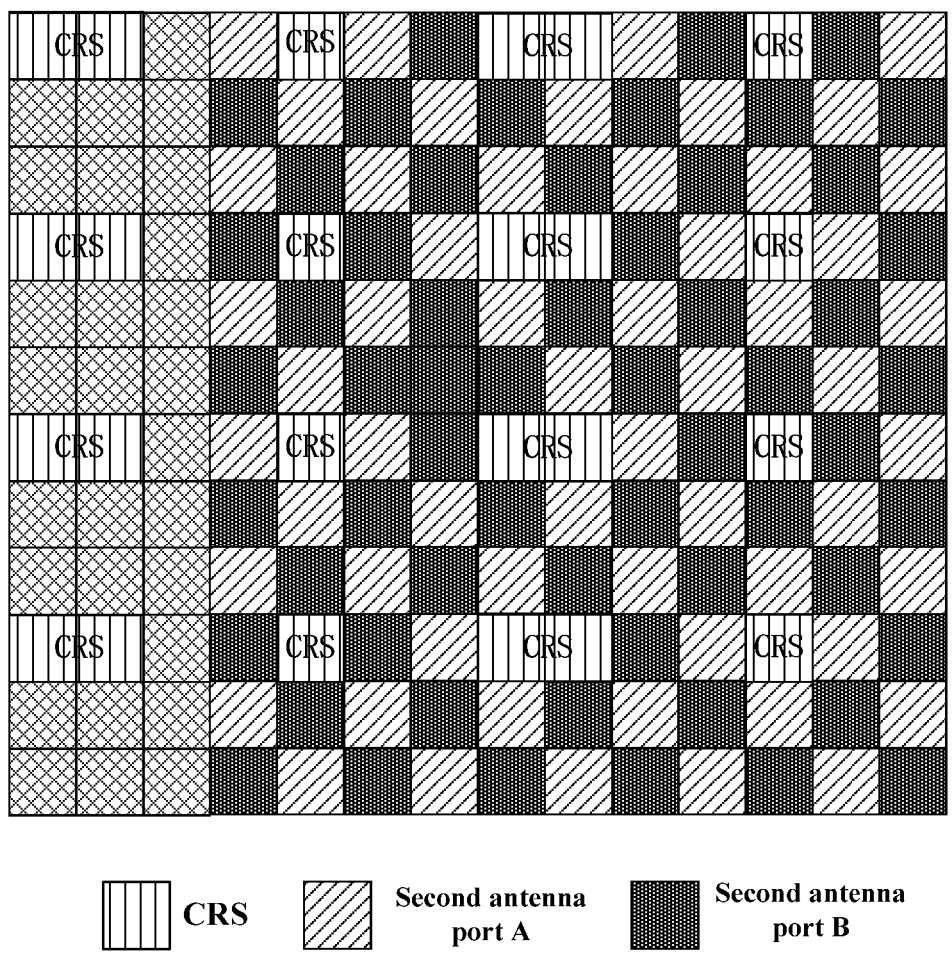
FIG. 5 schematically illustrates a relation between a NB-SSS and a port of a demodulation reference signal according to one embodiment of the present disclosure.

When the at least one second antenna port for transmitting the enhanced reference signal includes multiple antenna ports, resource mapping of the multiple antenna ports can apply a way such as FDM (Frequency Division Multiplexing) or TDM (Time Division Multiplexing). For example, if the at least one second antenna port for transmitting the enhanced reference signal includes two antenna ports, this two antenna ports (e.g., the second antenna ports PORT0' and PORT1') can apply the way as shown in FIG. 5 to implement resource mapping. That is to say, on each OFDM symbol that can be used by the enhanced reference signal, the enhanced reference signal implements mapping on alternative REs, and a mapping order is changed on two adjacent OFDM symbols.

A sequence of the enhanced reference signal can apply the Zadoff-chu sequence or the Gold sequence. For example, the enhanced reference signal can completely multiplex the design of the NB-SSS sequence in the above recited NB-IOT system, thus the NB-SSS can serve as a viable high density reference signal. In this case, the high density reference signal applies the Zadoff-chu sequence. In addition, other designs different from the Zadoff-chu sequence of the NB-SSS may be applied to serve as the high density reference signal, which will not be described in detail herein.

When the Gold sequence is applied, the sequence of the enhanced reference signal may apply generating ways similar to that of the C-RS sequence in the LTE protocol. For example:

$$r_{n_{subframe}}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

wherein $n_{subframe}$ indicates a serial number (the serial number starts from zero) of a sub-frame in a radio frame. For sequence generating in each sub-frame, an initial value of a pseudorandom sequence generator is:

$$c_{init} = 2^{10} \cdot (14 \cdot (n_{subframe}+1)+1) \cdot (2 \cdot N_{ID}^{cell}+1) + 2 \cdot N_{ID}^{cell} + N_{CP},$$ wherein $$N_{CP} = \begin{cases} 1 & \text{for normal } CP \\ 0 & \text{for extended } CP \end{cases}.$$

Further, the transmitting method may also include the following steps (not shown in FIG. 3).

Step S4: determining a first EPRE (Energy per Resource Element) of the demodulation reference signal and a second EPRE of the enhanced reference signal, and determining a ratio of the first EPRE to the second EPRE; and Step S5: sending the ratio to the terminal through a signaling.

In practical application, before the terminal uses the enhanced reference signal to enhance a channel estimation result of the demodulation reference signal, it may need to determine a ratio of the EPRE of the enhanced reference signal to the EPRE of the demodulation reference signal. Therefore, on the base station side, it needs to determine the first EPRE of the demodulation reference and the second EPRE of the enhanced reference signal, respectively, so as to determine the ratio of the first EPRE to the second EPRE.

Specifically, the base station may use the following two ways to determine a relation between the EPRE of the enhanced reference signal and the EPRE of the demodulation reference signal. One way is that, the base station and the terminal agree on a ratio of the EPRE of the enhanced reference signal to that of the demodulation reference signal (e.g., C-RS or UE-RS) in advance, that is, the ratio is pre-defined in a criterion, and the ratio is preferably set equal to one. Moreover, the base station may set the transmitting power of the demodulation reference signal and the transmitting power of the enhanced reference signal, respectively, according to the EPRE ratio agreed on in the criterion with the terminal in advance, and the ratio is preferably set equal to one.

Another way is that, the base station determines the ratio of the EPRE of the enhanced reference signal to the EPRE of the demodulation reference signal according to factors, such as a load of the system.

Afterwards, the base station still needs to inform the terminal about the ratio being determined through a signaling after the ratio is determined. For example, the base station may inform the terminal through a MIB (Master Information Block) signaling or a SIB (System Information Block) signaling.

In the present embodiment, the demodulation reference signal may further include other reference signals for the terminal signal demodulating physical downlink channel data.

Figure 6:
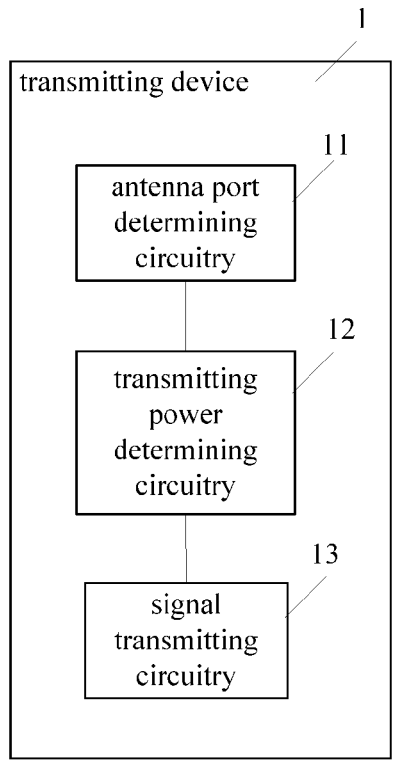
FIG. 6 schematically illustrates a device for transmitting a reference signal according to one embodiment of the present disclosure.

Base on the transmitting method of the reference signal as recited in the above embodiment, the present disclosure further provides a device for transmitting a reference signal. FIG. 6 schematically illustrates a device for transmitting a reference signal according to one embodiment of the present disclosure. Referring to FIG. 6, the transmitting device 1 includes: an antenna port determining circuitry 11, a transmitting power determining circuitry 12 and a signal transmitting circuitry 13.

Specifically, the antenna port determining circuitry 11 can determine at least one first antenna port for transmitting the demodulation reference signal and at least one second antenna port for transmitting the enhanced reference signal, wherein the at least one second antenna port and the at least one first antenna port being determined have an association, and the enhanced reference signal is used to implement an enhancement to a channel estimation of the demodulation reference signal.

The transmitting power determining circuitry 12 can determine a transmitting power of the demodulation reference signal and a transmitting power of the enhanced reference signal, respectively.

The signal transmitting circuitry 13 can transmit the demodulation reference signal and the enhanced reference signal to a terminal based on the first antenna port being determined for transmitting the demodulation reference signal and the second antenna port being determined for transmitting the enhanced reference signal, and according to the transmitting powers being set.

In some embodiments, the signal transmitting circuitry 13 can transmit all signals or part signals of the enhanced reference signal at sub-frame positions which locate before a main broadcasting channel and are adjacent.

In the present embodiment, the enhanced reference signal is a synchronizing signal. The synchronizing signal includes a primary synchronizing signal and a secondary synchronizing signal. The demodulation reference signal is C-RS or UE-RS, or a reference signal for the terminal demodulating the physical downlink channel data. The terminal is a NB-IOT terminal.

In the present embodiment, the antenna port determining circuitry 12 includes a first determining sub-circuitry (not shown in FIG. 6), the first determining sub-circuitry is configured to: if a number of the at least one first antenna port being determined for transmitting the demodulation reference signal is one, determine the first antenna port to serve as the at least one second antenna port for transmitting the enhanced reference signal.

The antenna port determining circuitry 12 includes a second determining sub-circuitry (not shown in FIG. 6). The second determining sub-circuitry is configured to: if a number of the at least one first antenna port being determined for transmitting the demodulation reference signal and a number of the at least one second antenna port being determined for transmitting the enhanced reference signal are equal and greater than one, determine the first antenna ports for transmitting the demodulation reference signal and the second antenna ports for transmitting the enhanced reference signal to correspond with each other in a one-to-one manner.

The antenna port determining circuitry 12 includes a third determining sub-circuitry (not shown in FIG. 6). The third determining sub-circuitry is configured to: if a number of the at least one first antenna port being determined for transmitting the demodulation reference signal is greater than one, and the enhanced reference signal includes multiple segmental reference signals, determine each of the first antenna ports to serve as the at least one second antenna port for transmitting each of the multiple segmental reference signals of the enhanced reference signal, respectively.

The antenna port determining circuitry 12 includes a fourth determining sub-circuitry (not shown in FIG. 6). The fourth determining sub-circuitry is configured to: if a number of the at least one first antenna port being determined for transmitting the demodulation reference signal is greater than one, and it is determined to transmit the enhanced reference signal according to a pre-determined transmission cycle, determine the multiple first antenna ports to serve as the at least one second antenna port for transmitting the enhanced reference signal in the transmission cycle in turn.

In the present embodiment, the transmitting device 1 further include:

A ratio determining circuitry (not shown in FIG. 6) configured to: determine a first EPRE of the demodulation reference signal and a second EPRE of the enhanced reference signal, and determine a ratio of the first EPRE to the second EPRE. The ratio determining circuitry can send the ratio to the terminal through a signaling. In some embodiments, the signaling is a MIB signaling or a SIB signaling. The ratio determining circuitry determines the ratio of the first EPRE to the second EPRE to be equal to one.

Figure 7:
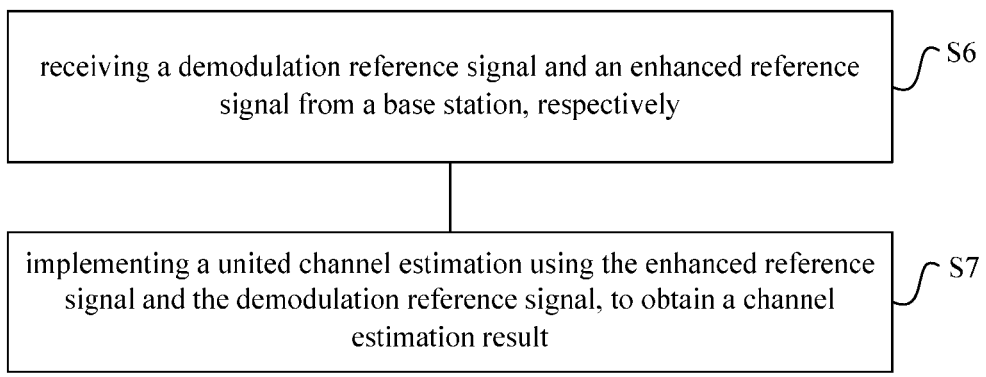
FIG. 7 schematically illustrates a flow chart of a method for receiving a reference signal according to one embodiment of the present disclosure.

Embodiments of the present disclosure also provide a method for channel estimation. FIG. 7 schematically illustrates a flow chart of a method for receiving a reference signal according to one embodiment of the present disclosure. Referring to FIG. 7, the receiving method includes following steps:

Step S6: receiving a demodulation reference signal and an enhanced reference signal from a base station, respectively;

Step S7: implementing a united channel estimation using the enhanced reference signal and the demodulation reference signal, to obtain a channel estimation result.

Specifically, in the coverage enhancing mode, the terminal receives the demodulation reference signal (e.g., the synchronizing signal C-RS or UE-RS as recited above) from the first antenna port of the base station.

In the $n^{th}$ sub-frame, a channel estimation result $h_n$ can be obtained by applying the demodulation reference signal of the sub-frame itself. Every M (wherein, M is a transmitted cycle of the enhanced reference signal) sub-frames can apply the enhanced reference signal to obtain a channel estimation result $h_{enh}$.

Further, the terminal implements the united channel estimation using the enhanced reference signal and the demodulation reference signal to obtain the channel estimation result. As such, since the enhanced reference signal is introduced, the channel estimation performance can be improved.

In the present embodiment, the united channel estimation is implemented by way of moving average.

Specifically, a calculation equation for the moving average is as following:

In a sub-frame not including the enhanced reference signal, the channel estimation result is:

$$H_n = a^* H_{n-1} + (1-a)^* h_n \qquad (1)$$

In a sub-frame including the enhanced reference signal, if there is a demodulation reference signal, the channel estimation result is:

$$H_n = p^* [a^* H_{n-1} + (1-a)^* h_n] + (1-p)^* h_{enh} \qquad (2)$$

In a sub-frame including the enhanced reference signal, if there is no demodulation reference signal, the channel estimation result is:

$$H_n = p^* H_{n-1} + (1-p)^* h_{enh} \qquad (3)$$

In the above recited equations (1), (2) and (3), the terminal can select values of factors a and p according to requirements and practical condition of the channel. The smaller the value of p is, the greater the influence of the enhancing channel estimation result $h_{enh}$ to the ultimate channel estimation result $H_n$ is. On the contrary, the smaller the influence is. The greater the value of a is, the greater the influence of the enhancing channel estimation result $h_{enh}$ to the ultimate channel estimation result $H_n$ is. On the contrary, the smaller the influence is.

Figure 8:
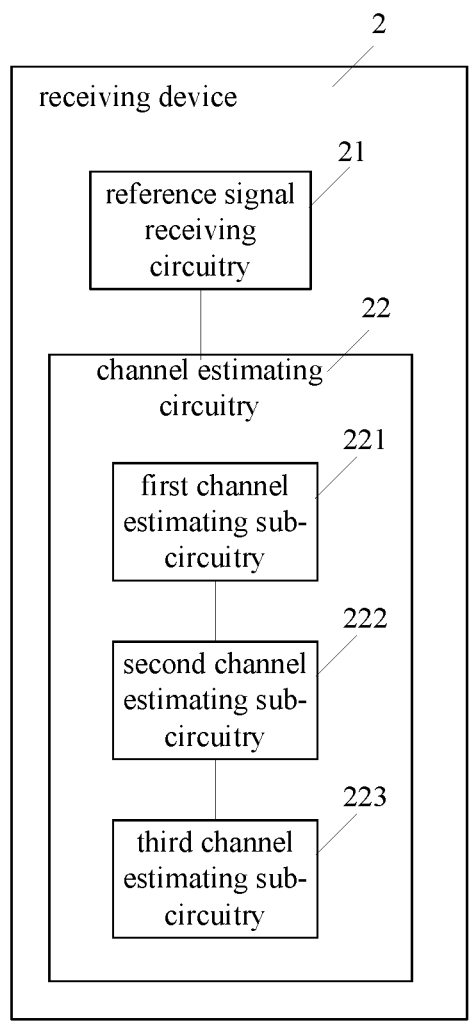
FIG. 8 schematically illustrates a structure of a device for receiving a reference signal according to one embodiment of the present disclosure.

According to the above recited method for channel estimation, embodiments of the present disclosure further provide a device for receiving a reference signal. FIG. 8 schematically illustrates a structure of a device for receiving a reference signal according to one embodiment of the present disclosure. Referring to FIG. 8, the receiving device 2 includes:

A reference signal receiving circuitry 21 configured to receive a demodulation reference signal and an enhanced reference signal sent from a base station;

A channel estimating circuitry 22 configured to implement a united channel estimation to the enhanced reference signal and the demodulation reference signal to obtain a channel estimation result.

In the present embodiment, the channel estimating circuitry can implement the united channel estimation by way of moving average. Specifically, the channel estimating circuitry 22 includes:

A first channel estimating sub-circuitry 221 configured to obtain, in a sub-frame not including the enhanced reference signal, a channel estimation result which is:

$$H_n = a*H_{n-1} + (1-a)*h_n;$$

A second channel estimating sub-circuitry 222 configured to: if there is a demodulation reference signal, obtain, in a sub-frame including the enhanced reference signal, a channel estimation result which is:

$$H_n = p*[a*H_{n-1} + (1-a)*h_n] + (1-p)*h_{enh};$$

A third channel estimating sub-circuitry 223 configured to: if there is no demodulation reference signal, obtain, in a sub-frame including the enhanced reference signal, a channel estimation result which is:

$$H_n = p*H_{n-1} + (1-p)*h_{enh}.$$

Wherein, $h_n$ is a channel estimation result obtained when the terminal applies the demodulation reference signal; $h_{enh}$ is a channel estimation result obtained when the terminal applies the enhanced reference signal; a and p are factors of the moving average, wherein 0<a and p<1; and $H_n$ is a channel estimation result of a previous sub-frame.

From above, when the technical solution of the present disclosure is applied, the channel estimation performance and the RRM measurement performance of the NB-IOT terminal can be effectively improved.

One skilled in the art can understand that, all steps or some of the steps in various methods of above recited embodiments of the present disclosure can be accomplished by hardware under instruction of programs. The programs can be stored in a readable storage medium of a computer, wherein the storage medium may include: ROM (Read Only Memory), RAM (Random Access Memory), magnetic disk, light disk, etc.

Although the present disclosure has been disclosed above with reference to preferred embodiments thereof, it should be understood by those skilled in the art that various changes and modifications may be made without departing from the spirit or scope of the disclosure. Accordingly, the present disclosure covers changes and modifications made to the present disclosure that fall into scopes defined by the claims and equivalent technical solutions thereof.

The invention claimed is:

1. A method for transmitting a reference signal, comprising:
   determining at least one first antenna port for transmitting a demodulation reference signal and at least one second antenna port for transmitting an enhanced reference signal, respectively, where the at least one second antenna port and the at least one first antenna port have an association;
   setting a transmitting power for the demodulation reference signal and a transmitting power for the enhanced reference signal, respectively; and
   transmitting the demodulation reference signal and the enhanced reference signal to a terminal based on the at least one first antenna port being determined for transmitting the demodulation reference signal and the at least one second antenna port being determined for transmitting the enhanced reference signal, and according to the transmitting powers being set.

2. The method for transmitting a reference signal according to claim 1, wherein determining at least one first antenna port for transmitting a demodulation reference signal and at least one second antenna port for transmitting an enhanced reference signal, respectively, comprises:
   if a number of the at least one first antenna port being determined for transmitting the demodulation reference signal is one, determining the first antenna port to serve as the at least one second antenna port for transmitting the enhanced reference signal.

3. The method for transmitting a reference signal according to claim 1, wherein determining at least one first antenna port for transmitting a demodulation reference signal and at least one second antenna port for transmitting an enhanced reference signal, respectively, comprises:
   if a number of the at least one first antenna port being determined for transmitting the demodulation reference signal and a number of the at least one second antenna port being determined for transmitting the enhanced reference signal are equal and greater than one, determining the first antenna ports for transmitting the demodulation reference signal and the second antenna ports for transmitting the enhanced reference signal to correspond with each other in a one-to-one manner.

4. The method for transmitting a reference signal according to claim 1, wherein determining at least one first antenna port for transmitting a demodulation reference signal and at least one second antenna port for transmitting an enhanced reference signal, respectively, comprises:
   if a number of the at least one first antenna port being determined for transmitting the demodulation reference signal is greater than one, and the enhanced reference signal comprises multiple segmental reference signals, determining the first antenna ports to serve as the at least one second antenna ports for transmitting the multiple segmental reference signals in the enhanced reference signal, respectively.

5. The method for transmitting a reference signal according to claim 1, wherein determining at least one first antenna port for transmitting a demodulation reference signal and at least one second antenna port for transmitting an enhanced reference signal, respectively comprises:
   if a number of the at least one first antenna port being determined for transmitting the demodulation reference signal is greater than one, and the enhanced reference signal is determined to be sent according to a predetermined transmission cycle, determining the first antenna ports to serve as the at least one second antenna port for transmitting the enhanced reference signal in each transmission cycle in turn.

6. The method for transmitting a reference signal according to claim 1, further comprising:
   determining a first EPRE (Energy per Resource Element) of the demodulation reference signal and a second EPRE of the enhanced reference signal, respectively, and determining a ratio of the first EPRE to the second EPRE; and
   sending the ratio to the terminal through a signaling.

7. The method for transmitting a reference signal according to claim 6, wherein the ratio of the first EPRE to the second EPRE is one.

8. The method for transmitting a reference signal according to claim 6, wherein the signaling is a MIB (Master Information Block) signaling or a SIB (System Information Block) signaling.

9. The method for transmitting a reference signal according to claim 1, wherein setting a transmitting power for the demodulation reference signal and a transmitting power for the enhanced reference signal, respectively, comprises:
respectively setting the transmitting power for the demodulation reference signal and the transmitting power for the enhanced reference signal according to a pre-determined ratio of a first EPRE (Energy per Resource Element) of the demodulation reference signal to a second EPRE of the enhanced reference signal.

10. The method for transmitting a reference signal according to claim 9, wherein the ratio of the first EPRE to the second EPRE is one.

11. The method for transmitting a reference signal according to claim 1, transmitting the enhanced reference signal to the terminal based on the at least one second antenna port being determined for transmitting the demodulation reference signal and according to the transmitting power for the enhanced reference signal being set comprises:
transmitting all or a part of the enhanced reference signal at sub-frame positions which locate before a main broadcasting channel and are adjacent to each other.

12. The method for transmitting a reference signal according to claim 1, wherein the enhanced reference signal is a synchronizing signal.

13. The method for transmitting a reference signal according to claim 12, wherein the synchronizing signal comprises a primary synchronizing signal and a secondary synchronizing signal.

14. The method for transmitting a reference signal according to claim 1, wherein the demodulation reference is a C-RS (Cell-specific Reference Signal), a UE-RS (User-specific Reference Signal) or a reference signal for the terminal to demodulate physical downlink channel data.

15. The method for transmitting a reference signal according to claim 1, wherein the terminal is a NB-IOT (Narrow Band Internet of Things) terminal.

16. The method for transmitting a reference signal according to claim 1, wherein the enhanced reference signal is sent to the terminal according to a pre-determined transmission cycle via the second antenna port.

17. A device for transmitting a reference signal, comprising:
an antenna port determining circuitry configured to determine at least one first antenna port for transmitting a demodulation reference signal and at least one second antenna port for transmitting an enhanced reference signal, respectively, wherein the at least one second antenna port and the at least one first antenna port have an association;
a transmitting power determining circuitry configured to set a transmitting power for the demodulation reference signal and a transmitting power for the enhanced reference signal, respectively; and
a signal transmitting circuitry configured to transmit the demodulation reference signal and the enhanced reference signal to a terminal based on the at least one first antenna port being determined for transmitting the demodulation reference signal and the at least one second antenna port being determined for transmitting the enhanced reference signal, and according to the transmitting powers being set.

18. The device for transmitting a reference signal according to claim 17, wherein the antenna port determining circuitry comprises a first determining sub-circuitry configured to: if a number of the at least one first antenna port being determined for transmitting the demodulation reference signal is one, determine the first antenna port to serve as the at least one second antenna port for transmitting the enhanced reference signal.

19. The device for transmitting a reference signal according to claim 17, wherein the antenna port determining circuitry comprises a second determining sub-circuitry configured to: if a number of the at least one first antenna port being determined for transmitting the demodulation reference signal and a number of the at least one second antenna port being determined for transmitting the enhanced reference signal are equal and greater than one, determine the first antenna ports for transmitting the demodulation reference signal and the second antenna ports for transmitting the enhanced reference signal to correspond with each other in a one-to-one manner.

20. The device for transmitting a reference signal according to claim 17, wherein the antenna port determining circuitry comprises a third determining sub-circuitry configured to: if a number of the at least one first antenna port being determined for transmitting the demodulation reference signal is greater than one, and the enhanced reference signal comprises multiple segmental reference signals, determine the first antenna ports to serve as the at least one second antenna port for transmitting the multiple segmental reference signals in the enhanced reference signal, respectively.

21. The device for transmitting a reference signal according to claim 17, wherein the antenna port determining circuitry comprises a fourth determining sub-circuitry configured to: if a number of the at least one first antenna port being determined for transmitting the demodulation reference signal is greater than one, and the enhanced reference signal is determined to be sent according to a pre-determined transmission cycle, determine the first antenna ports to serve as the at least one second antenna port for transmitting the enhanced reference signal in the transmission cycle in turn.

22. The device for transmitting a reference signal according to claim 17, further comprising:
a ratio determining circuitry configured to: determine a first EPRE (Energy per Resource Element) of the demodulation reference signal and a second EPRE of the enhanced reference signal, respectively, and determine a ratio of the first EPRE to the second EPRE; and
a ratio sending circuit configured to send the ratio to the terminal through a signaling.

23. The device for transmitting a reference signal according to claim 17, wherein the transmitting power determining circuitry is further configured to: set the transmitting power for the demodulation reference signal and the transmitting power for the enhanced reference signal according to a pre-determined ratio of a first EPRE (Energy per Resource Element) of the demodulation reference signal to a second EPRE of the enhanced reference signal, respectively.

24. The device for transmitting a reference signal according to claim 22, wherein the ratio determining circuitry determines the ratio of the first EPRE to the second EPRE to be one.

25. The device for transmitting a reference signal according to claim 23, wherein the ratio determining circuitry determines the ratio of the first EPRE to the second EPRE to be one.

26. The device for transmitting a reference signal according to claim 22, wherein the signaling is a MIB (Master Information Block) signaling or a SIB (System Information Block) signaling.

27. The device for transmitting a reference signal according to claim 17, wherein the signal transmitting circuitry is configured to transmit all or a part of the enhanced reference signal at sub-frame positions which locate before a main broadcasting channel and are adjacent to each other.

28. The device for transmitting a reference signal according to of claim 17, wherein the enhanced reference signal is a synchronizing signal.

29. The device for transmitting a reference signal according to claim 28, wherein the synchronizing signal comprises a primary synchronizing signal and a secondary synchronizing signal.

30. The device for transmitting a reference signal according of claim 17, wherein the demodulation reference is a C-RS (Cell-specific Reference Signal), a UE-RS (User-specific Reference Signal) or a reference signal for the terminal to demodulate physical downlink channel data.

31. The device for transmitting a reference signal according to claim 17, wherein the terminal is a NB-IOT (Narrow Band Internet of Things) terminal.

32. The device for transmitting a reference signal according to claim 17, wherein the signal transmitting circuitry is configured to transmit the enhanced reference signal to the terminal according to a pre-determined transmission cycle via the second antenna port.

33. A method for receiving a reference signal, comprising:
receiving a demodulation reference signal and an enhanced reference signal from a base station, respectively, where the demodulation reference signal and the enhanced reference signal are sent from the base station to a terminal by a method for transmitting a reference signal which comprises:
determining at least one first antenna port for transmitting a demodulation reference signal and at least one second antenna port for transmitting an enhanced reference signal, respectively, where the at least one second antenna port and the at least one first antenna port have an association,
setting a transmitting power for the demodulation reference signal and a transmitting power for the enhanced reference signal, respectively, and
transmitting the demodulation reference signal and the enhanced reference signal to a terminal based on the at least one first antenna port being determined for transmitting the demodulation reference signal and the at least one second antenna port being determined for transmitting the enhanced reference signal, and according to the transmitting powers being set; and
implementing a united channel estimation using the enhanced reference signal and the demodulation reference signal to obtain a channel estimation result.

34. The method for receiving a reference signal according to claim 33, wherein the united channel estimation using the enhanced reference signal and the demodulation reference signal is implemented by a way of moving average.

35. The method for receiving a reference signal according to claim 34, wherein the moving average comprises:

in a sub-frame not comprising the enhanced reference signal, the channel estimation result is:

$$H_n = a*H_{n-1} + (1-a)*h_n;$$

in a sub-frame comprising the enhanced reference signal, if there is the demodulation reference signal, the channel estimation result is:

$$H_n = p*[a*H_{n-1} + (1-a)*h_n] + (1-p)*h_{enh}; \text{ and}$$

in a sub-frame comprising the enhanced reference signal, if there is no demodulation reference signal, the channel estimation result is:

$$H_n = p*H_{n-1} + (1-p)*h_{enh},$$

wherein $h_n$ is a channel estimation result the terminal obtained by applying the demodulation reference signal; $h_{enh}$ a channel estimation result the terminal obtained by applying the enhanced reference signal; a and p are factors of the moving average, 0<a and p<1; and $H_{n-1}$ is a channel estimation result of a previous sub-frame.

36. A device for receiving a reference signal, comprising:
a reference signal receiving circuitry configured to receive a demodulation reference signal and an enhanced reference signal from a base station, respectively, where the demodulation reference signal and the enhanced references signal are sent from the base station to a terminal by a device for transmitting a reference signal which comprises:
an antenna port determining circuitry configured to determine at least one first antenna port for transmitting a demodulation reference signal and at least one second antenna port for transmitting an enhanced reference signal, respectively, wherein the at least one second antenna port and the at least one first antenna port have an association,
a transmitting power determining circuitry configured to set a transmitting power for the demodulation reference signal and a transmitting power for the enhanced reference signal, respectively, and
a signal transmitting circuitry configured to transmit the demodulation reference signal and the enhanced reference signal to a terminal based on the at least one first antenna port being determined for transmitting the demodulation reference signal and the at least one second antenna port being determined for transmitting the enhanced reference signal, and according to the transmitting powers being set; and
a channel estimating circuitry configured to implement a united channel estimation using the enhanced reference signal and the demodulation reference signal to obtain a channel estimation result.

37. The device for receiving a reference signal according to claim 36, wherein the channel estimating circuitry implements the united channel estimation using the enhanced reference signal and the demodulation reference signal by a way of moving average.

38. The device for receiving a reference signal according to claim 37, wherein the channel estimating circuitry comprises:
a first channel estimating sub-circuitry configured to: in a sub-frame not comprising the enhanced reference signal, obtain a channel estimation result which is:

$$H_n = a*H_{n-1} + (1-a)*h_n;$$

a second channel estimating sub-circuitry configured to: in a sub-frame comprising the enhanced reference signal, if there is the demodulation reference signal, obtain a channel estimation result which is:

$$H_n = p*[a*H_{n-1}+(1-a)*h_n]+(1-p)*h_{enh};\text{ and}$$

a third channel estimating sub-circuitry configured to: in a sub-frame comprising the enhanced reference signal, if there is no demodulation reference signal, to obtain a channel estimation result which is:

$$H_n = p*H_{n-1}+(1-p)*h_{enh},$$

wherein $h_n$ is a channel estimation result the terminal obtained by applying the demodulation reference signal; $h_{enh}$ a channel estimation result the terminal obtained by applying the enhanced reference signal; a and p are factors of the moving average, 0<a and p<1; and $H_{n-1}$ is a channel estimation result of a previous sub-frame.

* * * * *